US006609087B1

(12) United States Patent
Miller et al.

(10) Patent No.: US 6,609,087 B1
(45) Date of Patent: Aug. 19, 2003

(54) FACT RECOGNITION SYSTEM

(75) Inventors: Scott Miller, Waban, MA (US); Lance Arthur Ramshaw, Concord, MA (US); Heidi Jennifer Fox, Watertown, MA (US); Ralph Mark Weischedel, Canton, MA (US)

(73) Assignees: Genuity Inc., Burlington, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/300,922

(22) Filed: Apr. 28, 1999

(51) Int. Cl.$^7$ ................................................. G06F 9/45
(52) U.S. Cl. ................................ 703/22; 703/2; 707/1; 707/5; 704/1; 704/9
(58) Field of Search ............................... 707/5, 1; 704/9, 704/1; 382/155, 177; 703/22; 706/45

(56) References Cited

U.S. PATENT DOCUMENTS

| | | | | |
|---|---|---|---|---|
| 5,406,480 A | * | 4/1995 | Kanno ........................ | 364/419 |
| 5,418,717 A | * | 5/1995 | Su et al. ..................... | 364/419 |
| 5,752,052 A | * | 5/1998 | Richardson et al. ........ | 395/759 |
| 5,839,106 A | * | 11/1998 | Bellegarda ................... | 704/257 |
| 5,841,895 A | * | 11/1998 | Huffman ...................... | 382/155 |
| 5,926,784 A | * | 7/1999 | Richardson et al. ............ | 704/9 |
| 6,006,221 A | * | 12/1999 | Liddy et al. .................... | 707/5 |
| 6,029,195 A | * | 2/2000 | Herz ............................ | 709/219 |
| 6,112,168 A | * | 8/2000 | Corston et al. ................. | 704/9 |
| 6,167,369 A | * | 12/2000 | Schultz .......................... | 704/9 |
| 6,243,669 B1 | * | 6/2001 | Horiguchi et al. .............. | 704/9 |
| 6,278,967 B1 | * | 8/2001 | Akers et al. .................... | 704/2 |
| 6,278,968 B1 | * | 8/2001 | Franz et al. .................... | 704/3 |
| 6,304,870 B1 | * | 10/2001 | Kushmerick et al. .......... | 707/4 |

OTHER PUBLICATIONS

"Empirical Methods in Information Extraction" Claire Cardie, American Association of Artificial Intelligence (AAAI), Winter 1997, 0738–4602–1997.*
"Information Extraction" Jim Cowie, Communications of the ACM, Jan. 1996/vol. 39, No. 1.*
"A system for Discovering Relationships by Feature Extraction from Text Databases" Jack G. Conrad, Springer–Verloag NY,NY pp. 260–270, 1994.*
W. Lehnert et al., UMass/Hughes: Description of the Circus System Used for MUC–5, Proc. Of Fifth Message Understanding Conference (MUC–50) 1993, pp. 277–291.
Michael Collins, Three Generative, Lexicalised Models for Statistical Parsing, Proc. Of the $35^{th}$ Annual Meeting of the Association for Computational Linguistics, 1997, pp. 16–23.
Eric Brill, Automatic Grammar Induction and Parsing Free Text: A Transformation–Based Approach, Proc. Of the $31^{st}$ Annual Meeting of the Association for Computational Linguistics, 1993, pp. 259–265.

(List continued on next page.)

Primary Examiner—Hugh Jones
Assistant Examiner—Fred Ferris
(74) Attorney, Agent, or Firm—Leonard Charles Suchyta; James K. Weixel

(57) ABSTRACT

In accordance with methods and systems consistent with the present invention, an improved fact recognition system is provided that automatically learns from syntactic language examples and semantic language examples, thus facilitating development of the system. The language examples are rather simplistic and can be provided by a lay person with little training, thus relieving the need for knowledge engineers. Furthermore, the learning performed by the improved fact recognition system results in a collection of probabilities that is used by the system to recognize facts in a typically more accurate manner than conventional systems.

5 Claims, 9 Drawing Sheets

OTHER PUBLICATIONS

Scott W. Bennett et al., Learning to Tag Multilingual Texts Through Observation, Proc. Of the Second Conf. On Empirical Methods in Natural Language Processing, 1997, pp. 109–115.

Chinatsu Aone et al., SRA: Description of the $IE^2$ System Used for MUC–7, available at http://www.muc.saic.com/proceedings/muc_7_toc.html.

Roman Yangarber et al., NYU: Description of the Proteus/PET System as Used for MUC–7 ST, available at http://www.muc.saic.com/proceedings/muc_7_toc.html.

K. Humphreys et al., University of Sheffield: Description of the LaSIE–II System as Used for MUC–7, available at http://www.muc.saic.com/proceedings/muc_7_toc.html.

Terry Patten et al., Description of the TASC System Used for MUC–7, available at http://www.muc.saic.com/proceedings/muc_7_toc.html.

Mitchell P. Marcus et al., Building a Large Annotated Corpus of English: The Penn Treebank, Computational Linguistics, vol. 19, No. 2, pp. 313–330 (1993).

Daniel H. Younger, Recognition and Parsing of Context–Free Languages in Time $n^3$, Information and Control, 10, 189–208 (1967).

* cited by examiner

FACT RECOGNITION SYSTEM

FIELD OF THE INVENTION

The present invention relates generally to data processing systems and, more particularly, to an improved fact recognition system.

BACKGROUND OF THE INVENTION

Conventional fact recognition systems recognize facts contained in input data and populate a data store, like a database, with the recognized facts. As used herein, the term "fact" refers to a relationship between entities, such as people, places, or things. For example, upon receiving the input data "John Smith is the president of XYZ Corp.," a fact recognition system identifies the fact that the president of XYZ Corp. is John Smith and stores this fact into a database. Thus, fact recognition systems automatically extract facts from input data so a user does not have to read the input data.

To recognize facts, conventional systems utilize rules. An example of one such rule follows:

<person-name> a|the <job-name> of <company-name>

This rule is used to extract the fact that a person holds a particular job at a particular company. These rules are created by knowledge engineers, experts in the field of fact recognition. The knowledge engineers generate a large number of rules, and the system then applies these rules to a stream of input data to recognize the facts contained therein. If any part of the input stream matches a rule, the system extracts the fact and stores it into the database. Although conventional systems provide beneficial functionality by storing facts retrieved from input data, these systems suffer from a number of drawbacks because (1) very few knowledge engineers exist who can create the rules, (2) the development of the systems takes a long time as rule creation is a very tedious and time-consuming task, and (3) the systems are not very accurate in recognizing facts. It is therefore desirable to improve fact recognition systems.

DISCLOSURE OF THE INVENTION

In accordance with methods and systems consistent with the present invention, an improved fact recognition system is provided that automatically learns from syntactic language examples and semantic language examples, thus facilitating development of the system. The language examples are rather simplistic and can be provided by a lay person with little training, thus relieving the need for knowledge engineers. Furthermore, the learning performed by the improved fact recognition system results in a collection of probabilities that is used by the system to recognize facts in a typically more accurate manner than conventional systems.

In accordance with methods consistent with the present invention, a method is provided in a data processing system. This method receives syntactic language examples and receives semantic language examples. Furthermore, this method creates a model from both the syntactic language examples and the semantic language examples and uses the model to determine the meaning of a sequence of words.

In accordance with methods consistent with the present invention, a method is provided in a data processing system. This method receives a collection of probabilities that facilitate fact recognition, receives an input sequence of words reflecting a fact, and identifies the fact reflected by the input sequence of words using the collection of probabilities.

In accordance with systems consistent with the present invention, a computer-readable memory device encoded with a data structure is provided. This data structure contains a collection of probabilities for use in recognizing facts in input data.

In accordance with systems consistent with the present invention, a data processing system is provided that comprises a memory and a processor. The memory includes a statistical model with probabilities reflecting likely syntactic structure for sequences of one or more words and likely semantic information for the sequences. The memory also includes a training program for generating the statistical model and a search program for receiving a sentence reflecting a fact and for using the statistical model to recognize the fact. The processor runs the training program and the search program.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
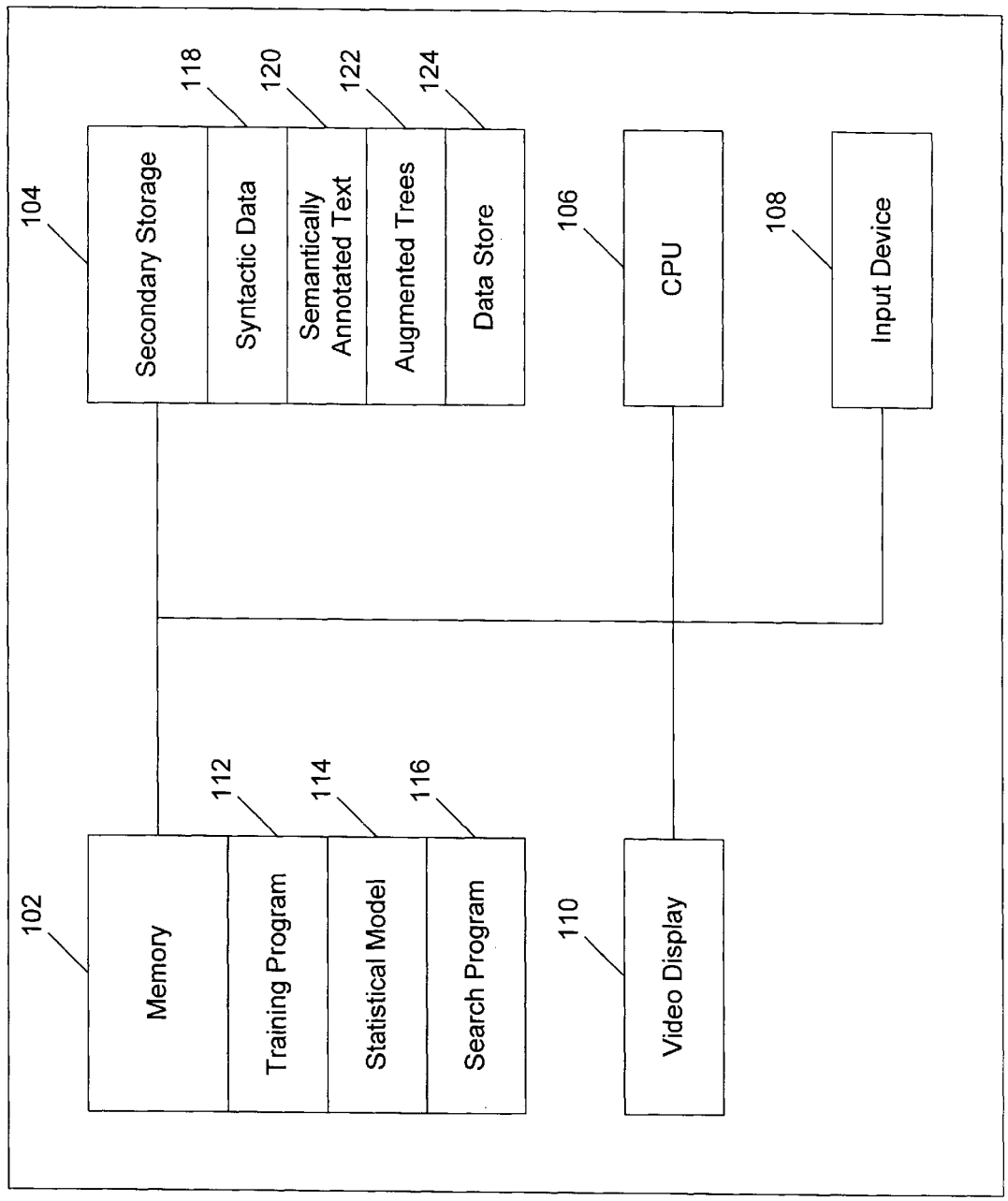
FIG. 1 depicts a data processing system suitable for use with methods and systems consistent with the present invention.

In accordance with methods and systems consistent with the present invention, an improved fact recognition system is provided that is generally easier and faster to develop than conventional systems and that is generally more accurate than conventional systems. This system recognizes facts in an input stream like a news wire and populates a data store with those facts without the user having to read the input stream. The improved fact recognition system automatically learns from rather simple syntactic language examples and semantic language examples, provided by a lay person with little training. Since the improved system automatically learns from rather simple language examples provided by a lay person, it is generally easier and faster to develop than conventional systems and alleviates the need for using knowledge engineers. Upon learning from the language examples, the system generates a collection of probabilities, known as the statistical model, that is used to determine the meaning of an input stream and identify the facts contained in it in a typically more accurate manner than conventional systems. As a result, the improved fact recognition system has a number of advantages over conventional systems.

At the heart of this system lies a statistical model that is used to recognize facts in the input stream. It integrates both syntax information and semantic information, thus yielding highly accurate results. It is based on a generative model that models the process used by humans when creating a sentence. The generative model assumes that humans create sentences in a top-down manner, first indicating higher level syntax and semantic information (e.g., the overall form of the sentence). Then, the human provides both semantic and syntactic information regarding lower level structures (e.g., adjectives, prepositional phrases, etc.). This process continues until reaching the atomic (or word) level.

Overview

The improved fact recognition system comprises three major components: a training program, a statistical model, and a search program. The training program trains the system off-line, preparing it for on-line utilization. Specifically, the training program receives syntactic language examples, comprising numerous English sentences with an indication of their syntactic elements (e.g., nouns, verbs, etc.), and generates probabilities for the likelihood of various syntactic elements occurring in the English language. The training program then receives semantically annotated sentences, comprising a number of sentences marked up by an annotator who indicates the meaning of various words as well as their relationship to other words. This marking up requires little technical expertise and thus can be performed by a lay person. Upon receiving the semantically annotated sentences, the training program generates syntactic representations that most likely match the syntax of the sentences based on the previously generated probabilities and the semantic annotations. After generating the syntactic representations, the training program augments the representations to include meaning (i.e., the semantic information provided by the annotator). Once augmented, the training program generates a collection of probabilities based on both the semantic information and the syntactic information in the augmented representations. This collection, referred to as the statistical model, can then be used to identify the likely meaning and likely syntactic structure of any sentence in the English language. The generation of the statistical model reflects the system having learned to recognize facts in sentences.

After the training program generates the statistical model, the search program uses it at run time to recognize facts contained in various input sentences. At run time, the search program receives a sentence, generates syntactic representations that may match the sentence's syntactic structure based on the statistical model,. and then selects the representation with the highest probability of matching the syntactic structure of the sentence. Once this representation has been identified, the representation identifies both the relationship among words as well as the meaning of the words so that the system can recognize the facts in the sentence and store them into a data store. For example, if this sentence were "Bill Clinton is the President of the United States," the system recognizes the fact that the President of the United States is Bill Clinton and then stores this fact into a database.

Implementation Details

FIG. 1 depicts a data processing system 100 suitable for use with methods and systems consistent with the present invention. Data processing system 100 comprises a memory 102, a secondary storage device 104, a central processing unit (CPU) 106, an input device 108, and a video display 110. Memory 102 includes a training program 112, a statistical model 114, and a search program 116. Secondary storage device 104 contains syntactic data 118, semantically annotated text 120, augmented trees 122, and a data store 124.

Figure 2:
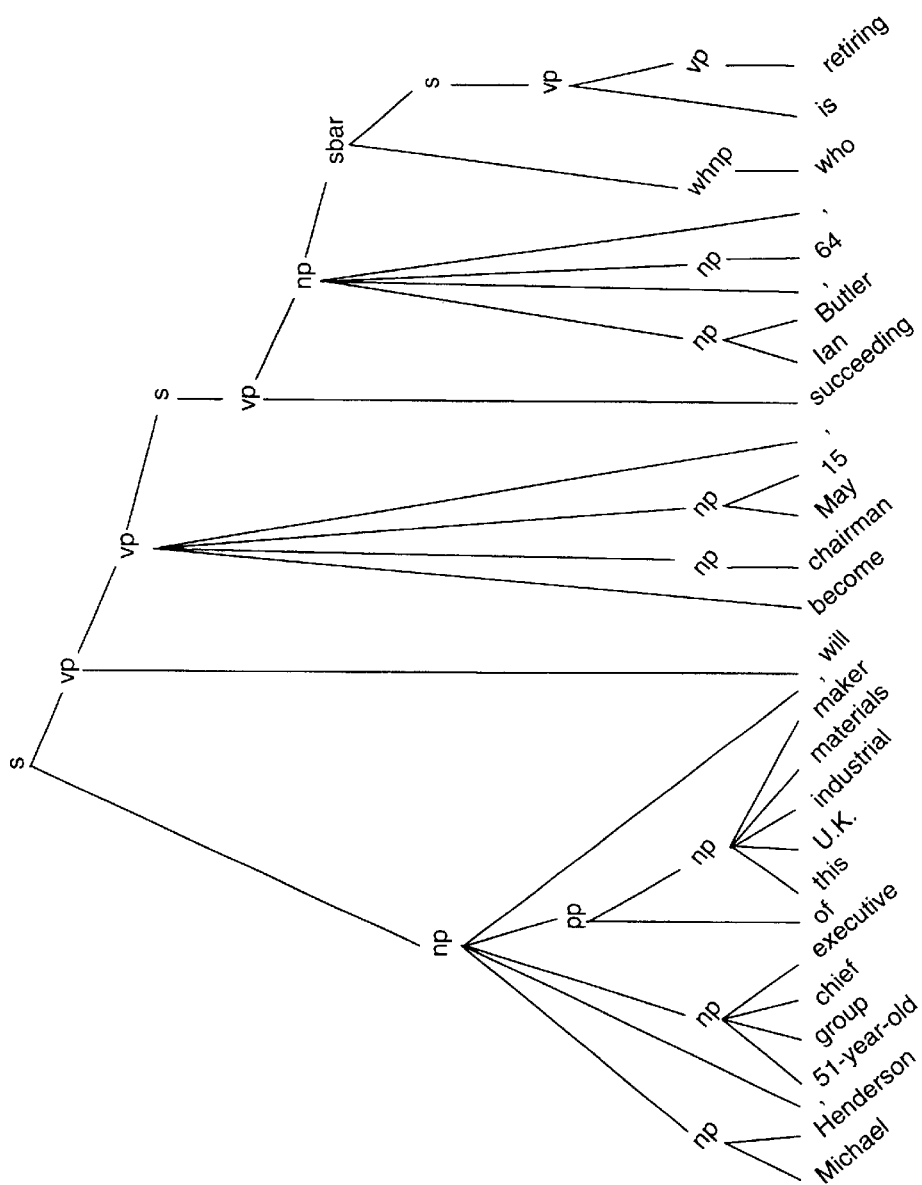
FIG. 2 depicts an example tree in the syntactic data depicted in FIG. 1.

Syntactic data 118 is a well-known collection of data, known as Penn Tree Bank, comprising trees reflecting the syntactic structure of various English language sentences derived from The Wall Street Journal. Although the trees were derived from The Wall Street Journal, the improved fact recognition system can nonetheless be utilized in a different domain (e.g., Aerospace) and, hence, is not limited to recognizing facts associated with financial news. FIG. 2 depicts an example of a tree from the syntactic data, indicating a sentence at the bottom of the figure and the syntactic structure for that sentence above it. The tree of FIG. 2 contains nodes with tags indicating noun phrases (NP); prepositional phrases (PP); verb phrases (VP); clauses (SBAR); who is noun phrases (WHNP), which includes noun phrases starting with who, what, when, or where; and a sentence within a sentence or the entire sentence (S). The method used for tagging the sentences as well as the Penn Tree Bank are well-known and are further described in Marcus, Santorini, and Marcinkiewicz, "Building a Large Annotated Corpus of English: the Penn Tree Bank," *Computational Linguistics,* 19(2): 313–330 (1993).

Figure 3:
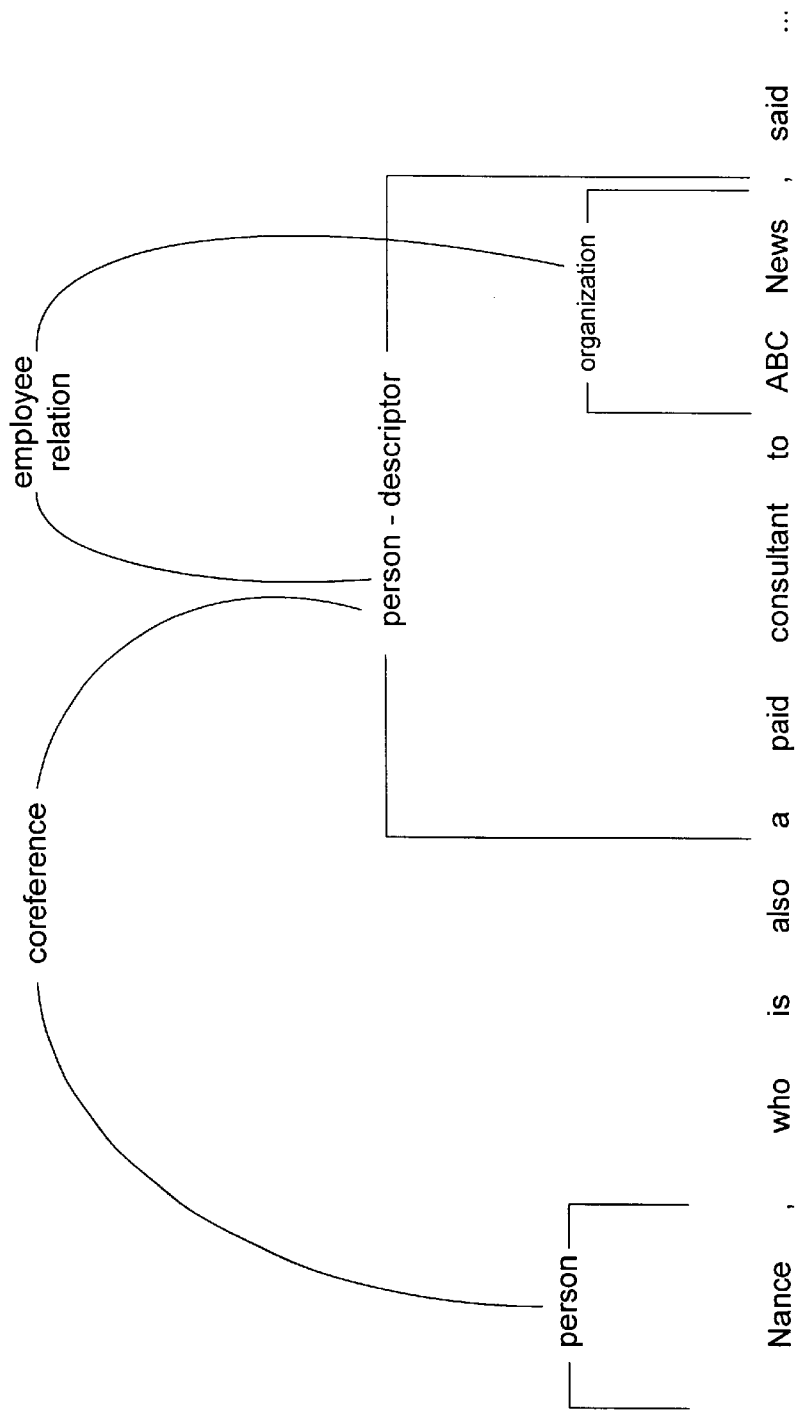
FIG. 3 depicts an example semantically annotated sentence contained in the semantically annotated text depicted in FIG. 1.

Semantically annotated text 120 comprises a number of sentences annotated by a lay person. An example of a semantically annotated sentence appears in FIG. 3. In this Figure, an annotator has marked up a sentence indicating that a person (Nance) refers to a person descriptor (a paid consultant to ABC News) and the person descriptor has an employee relationship to an organization (ABC News). In this manner, the annotator has provided the semantic meaning of a number of sentences.

Augmented trees 122 are generated by the training program and are discussed in further detail below. Data store 124 stores the facts recognized by search program 116.

Although data processing system 100 has been described relative to a particular configuration, one skilled in the art will appreciate that it may contain additional or different components. Also, although it is described relative to the English language, one skilled in the art will appreciate that methods and systems consistent with the present invention can be used with other languages. Furthermore, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network such as the Internet; or other forms of RAM or ROM that are either currently known or later developed.

Figure 4:
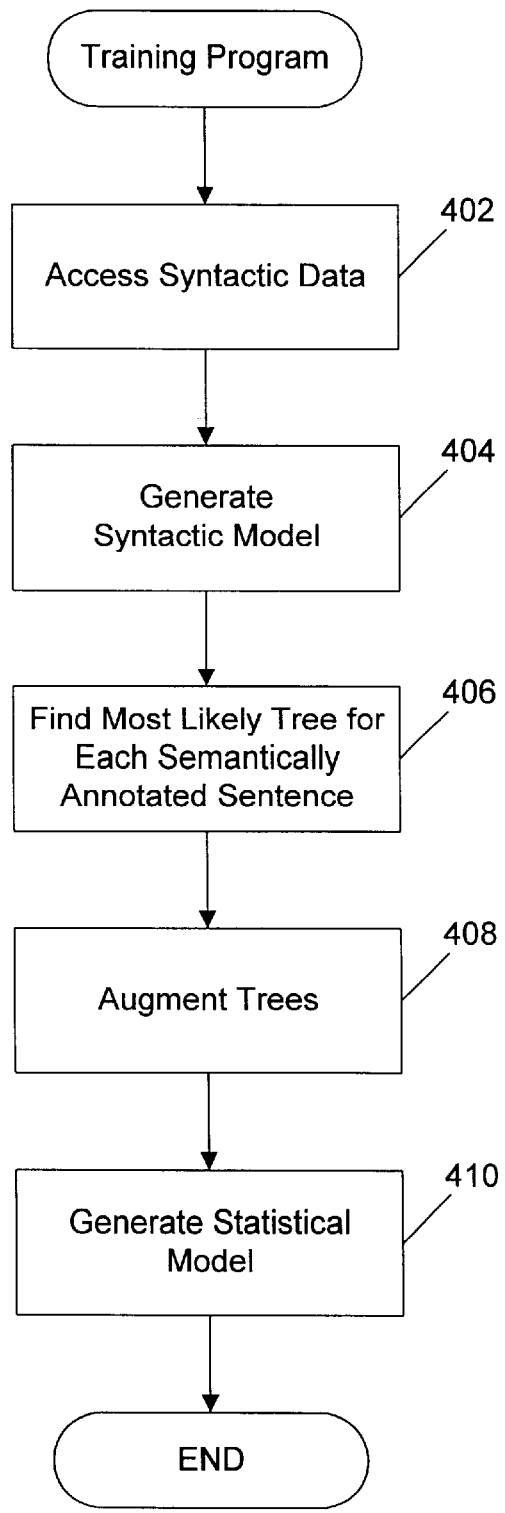
FIG. 4 depicts a flowchart of the steps performed by the training program depicted in FIG. 1.

FIG. 4 depicts a flowchart of the steps performed by the training program in accordance with methods and systems consistent with the present invention. The first step performed by the training program is to access the syntactic data (step 402). After accessing the syntactic data, the training program generates a syntactic model (step 404). The syntactic model contains a collection of probabilities based on an examination of all of the trees in the syntactic data. This collection of probabilities reflects the likelihood of various syntactic elements (e.g., nouns) occurring in various combinations in the English language. In this step, for each node of each tree in the syntactic data, the training program counts the number of times that various events (e) occur as well as the event's history (h) so that a probability of the event given the history (P(e|h)) can be derived. Such events and histories include the probability of a verb phrase occurring given a sentence, "$P(V_P|S)$." The collection of probabilities and the counts needed to derive each probability are provided below with a description of each term. In the below description, the processing utilizes the head constituent of a node. The "head constituent" of a parent node refers to one of the child nodes that conveys the most meaning of the parent node. For example, in the tree of FIG. 2, the uppermost "s" node has two child nodes, "np" and "vp." In this situation, the vp conveys the most meaning of the sentence, so it is designated as the head constituent. The head constituent is a well known linguistic concept as further described in Pollard and Sag, Head Driven Phrase Structure Grammar, CSCI, Stanford and University of Chicago Press (1994).

The syntactic model is then generated by dividing each count for each combination of event and history by the count of the history, $P(e|h)=C(e|h)$, to yield a probability for that event $$\frac{C(e|h)}{C(h)}$$

given its history. For example, to determine the probability of a particular verb phrase "$V_P$" occurring in any sentence "S," the training program counts all occurrences of this verb phrase in all sentences, counts the total number of sentences, and divides the first count by the second count. All of these probabilities are then retained as the syntactic model.

After generating the syntactic model, the training program finds the most likely tree for each semantically annotated sentence (step 406). In this step, the training program examines each sentence in the semantically annotated text

| Probabilities | Counts |
| --- | --- |
| $P(c_h|c_p)$ | $C(c_h|c_p)$ |
| | $C(c_p)$ |
| $P_L(c_m|c_p, c_{hp}, c_{m-1}, w_p) = \lambda_1 P_L(c_m|c_p, c_{hp}, c_{m-1}, w_p) + \lambda_2 P_L(c_m|c_p, c_{hp}, c_{m-1})$ | $C(c_m|c_p, c_{hp}, c_{m-1}, w_p)$ |
| | $C(c_p, c_{hp}, c_{m-1}, w_p)$ |
| | $C(c_m|c_p, c_{hp}, c_{m-1})$ |
| | $C(c_p, c_{hp}, c_{m-1})$ |
| $P_R(c_m|c_p, c_{hp}, c_{m-1}, w_p) = \lambda_1 P_R(c_m|c_p, c_{hp}, c_{m-1}, w_p) + \lambda_2 P_R(c_m|c_p, c_{hp}, c_{m-1})$ | $C(c_m|c_p, c_{hp}, c_{m-1}, w_p)$ |
| | $C(c_p, c_{hp}, c_{m-1}, w_p)$ |
| | $C(c_m|c_p, c_{hp}, c_{m-1})$ |
| | $C(c_p, c_{hp}, c_{m-1})$ |
| $P(t_m|c_m, t_h, w_h) = \lambda_1 P(t_m|c_m, w_h) + \lambda_2 P(t_m|c_m, t_h) + \lambda_3 P(t_m|c_m)$ | $C(t_m|c_m, w_h)$ |
| | $C(c_m, w_h)$ |
| | $C(t_m|c_m, t_h)$ |
| | $C(c_m, t_h)$ |
| | $C(t_m|c_m)$ |
| | $C(c_m)$ |
| $P(w_m|c_m, t_m, t_h, w_h) = \lambda_1 P(w_m|c_m, t_m, w_h) + \lambda_2 P(w_m|c_m, t_m, t_h) + \lambda_3 P(w_m|c_m, t_m) + \lambda_4 P(w_m|t_m)$ | $C(w_m|c_m, t_m, w_h)$ |
| | $C(c_m, t_m, w_h)$ |
| | $C(w_m|c_m, t_m, t_h)$ |
| | $C(c_m, t_m, t_h)$ |
| | $C(w_m|c_m, t_m)$ |
| | $C(c_m, t_m)$ |
| | $C(w_m|t_m)$ |
| | $C(t_m)$ |
| $P(f_m|c_m, t_m, t_h, w_h, \text{known}(w_m)) = \lambda_1(f_m|c_m, t_m, w_h, \text{known}(w_n)) + \lambda_2 P(f_m|c_m, t_m, t_h, \text{known}(w_n)) + \lambda_3 P(f_m|c_m, t_m, \text{known}(w_m)) + \lambda_4 P(f_m|t_m, \text{known}(w_m))$ | $C(f_m|c_m, t_m, w_h, \text{known}(w_m))$ |
| | $C(c_m, t_m, w_h, \text{known}(w_m))$ |
| | $C(f_m|c_m, t_m, t_h, \text{known}(w_m))$ |
| | $C(c_m, t_m, t_h, \text{known}(w_m))$ |
| | $C(f_m|c_m, t_m, \text{known}(w_m))$ |
| | $C(c_m, t_m, \text{known}(w_m))$ |
| | $C(f_m|t_m, \text{known}(w_n))$ |
| | $C(t_m, \text{known}(w_m))$ |

Figure 5:
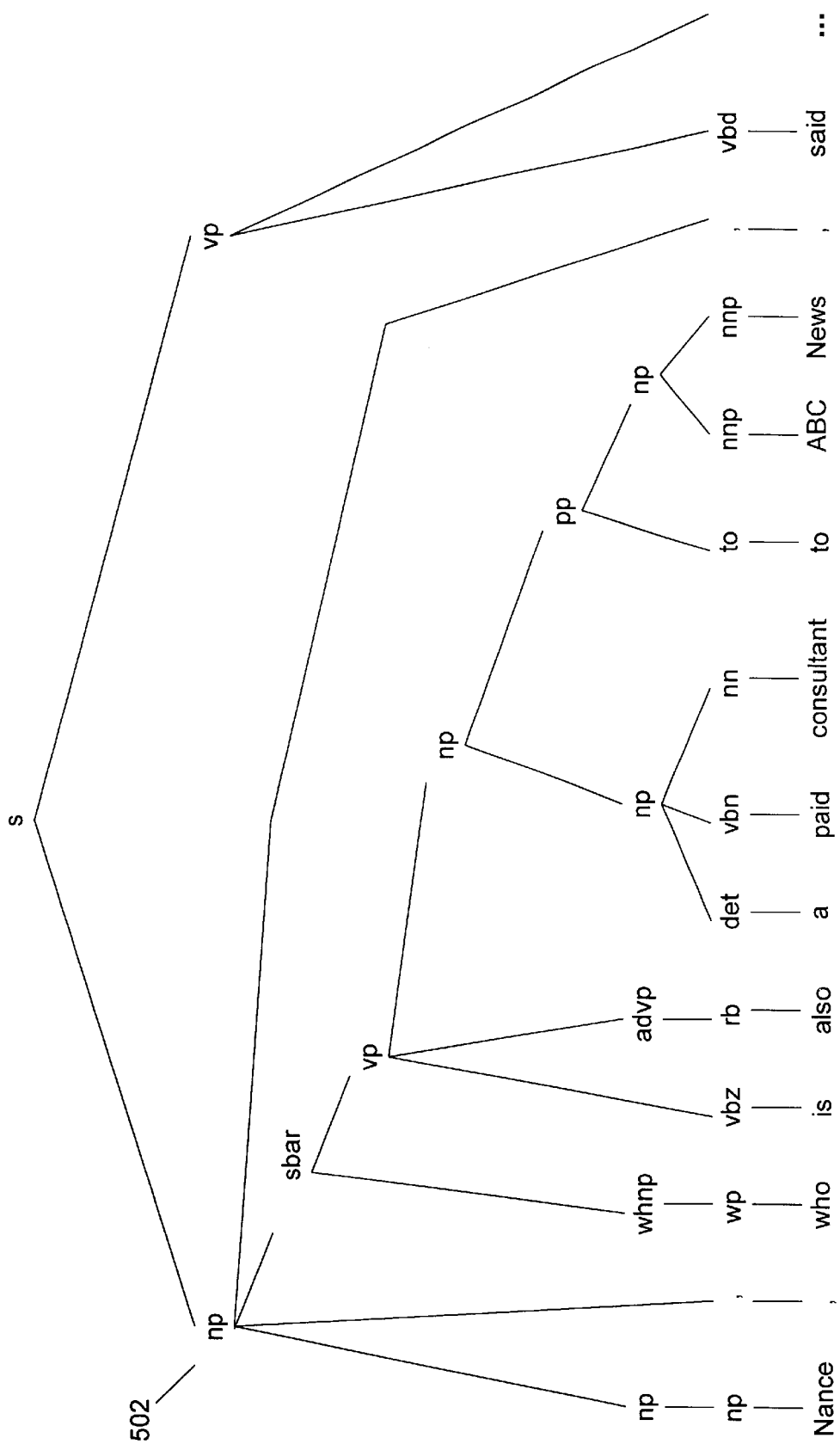
FIG. 5 depicts a tree generated by the training program depicted in FIG. 1.

Where,
"c" denotes instances of different node labels,
"$c_m$" denotes the node label of the modifier being generated,
"$c_h$" denotes the node label of the head constituent,
"$c_p$" denotes the parent node to the node currently being evaluated,
"$c_{hp}$" denotes the head constituent of the parent node to the current node,
"$w_m$" denotes a particular word,
"known ($w_m$)" denotes whether the particular word has been observed before in this or another tree,
"$f_m$" denotes word features such as capitalization, plurality, and tense,
"$c_{m-1}$" denotes the node that is next closest to the head constituent from the current node,
"$w_h$" and "$w_p$" denotes the head word for the parent node of the current node,
"$t_m$" denotes the tag (e.g., NP) for the head constituent of the current node,
"$t_h$" denotes the tag for the head constituent of the parent node to the current node,
"$P_L$" denotes probabilities associated with premodifiers (modifiers appearing before the head constituent),
"$P_R$" denotes probabilities associated with postmodifiers (modifiers appearing after the head constituent), and
"$\lambda$" denotes a smoothing function.

and, using the syntactic model, identifies a tree structure that most likely represents the syntactic structure of that sentence by using the search program, further discussed below relative to steps 801 to 806 of FIG. 8. FIG. 5 depicts an example of a tree that most likely represents the syntactic structure of the annotated sentence in FIG. 3.

Figure 6:
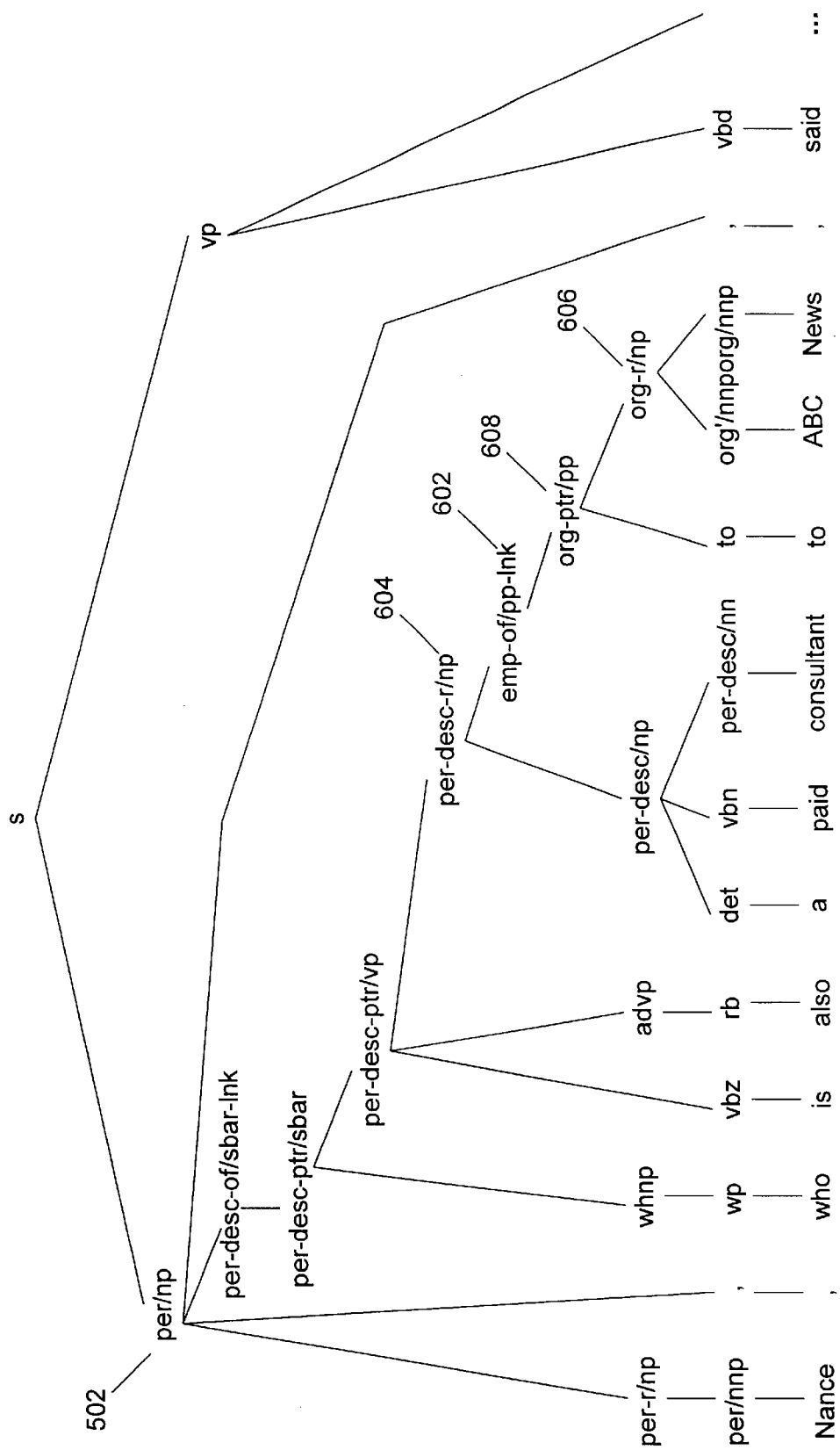
FIG. 6 depicts an augmented tree created by the training program depicted in Fig. 1.
Figure 7A:
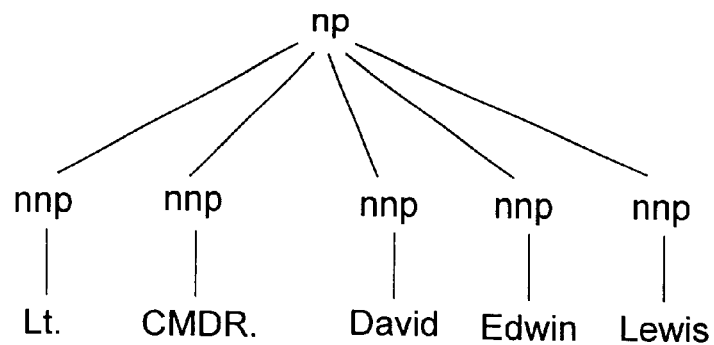
FIGS. 7A–7D depict exemplary trees illustrating the augmentation process performed by the training program depicted in FIG. 1.
Figure 7B:
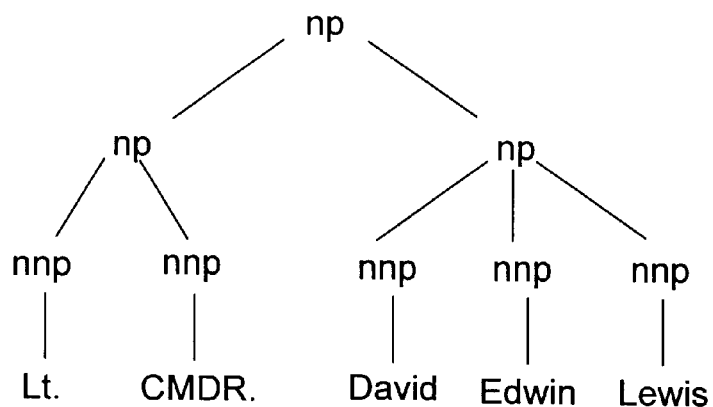

After the most likely tree is identified for each semantically annotated sentence, the training program augments these trees with the semantically annotated information (step 408). In this step, the structure of the tree is modified to include the semantic information provided by the annotator. FIG. 6 depicts the tree of FIG. 5 augmented with the semantic information of FIG. 3. The training program augments the trees using a five-step process. First, the training program inserts nodes into the tree to distinguish names and descriptors that are not bracketed. A "name" refers to the name of an entity, such as a person, place, or thing, and a "descriptor" refers to a noun phrase describing an entity, such as a person, place, or thing. For example, as shown in FIG. 7A, when finding the most likely tree for each semantically annotated sentence, described above in step 406, the training program produces a single noun phrase with no internal structure for "Lt. Cmdr. David Edwin Lewis." The tag "nnp" refers to a proper noun. In this step, as shown in FIG. 7B, the training program inserts additional nodes to distinguish the descriptor "Lt. Cmdr." from the name "David Edwin Lewis."

Second, the training program attaches semantic labels to all nodes that correspond to names or descriptors. These labels reflect the entity type, such as a person, organization, or location, as well as whether the node is a proper name or a descriptor. For example, node 502 in FIG. 5 (np) becomes "per/np" in FIG. 6, indicating that the noun phrase refers to a person.

Figure 7C:
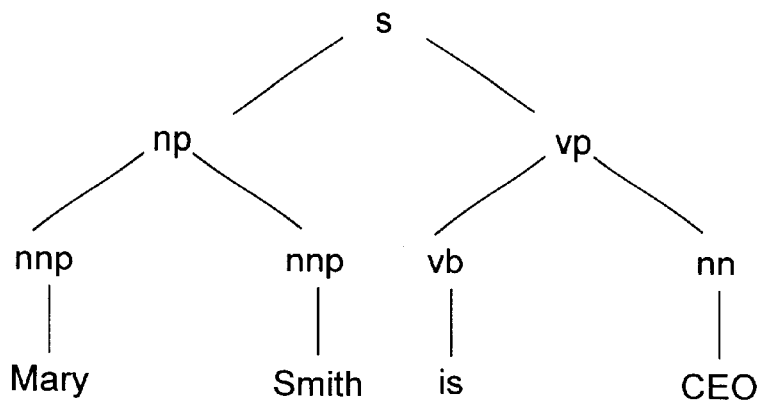
Figure 7D:
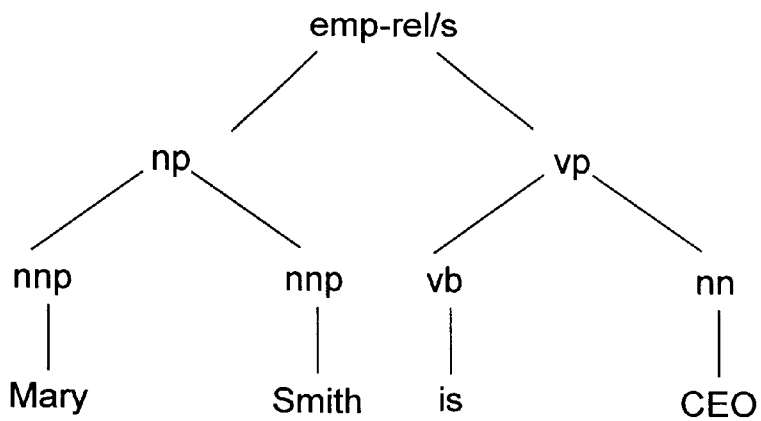

Third, when two entities have a relationship such that one entity is not a syntactic modifier of the other, the training program identifies the lowest node that spans both entities. For example, in FIG. 7C, "Mary Smith" has an employee relationship to "CEO" but does not modify it, and the lowest node spanning both entities is "S." After identifying the lowest node, the training program adds a semantic tag to that node denoting the relationship. For example, as shown in FIG. 7D, the tag "emp-rel" is added to the "S" node to indicate an employee relationship.

Fourth, the training program inserts nodes into the tree to distinguish the arguments to each relation. In cases where there is a relation between two entities and one of the entities is a syntactic modifier of the other, the inserted node serves to indicate their relation as well as the argument. For example, FIG. 3 indicates an employee relation between the person-descriptor (a paid consultant to ABC News) and the organization (ABC News). Thus, the training program adds node 602 in FIG. 6 to indicate this relation.

Fifth, whenever a relation involves an entity that is not a direct descendent of that relation in the tree, the training program attaches semantic pointer labels to all of the intermediate nodes. These labels serve to form a continuous chain between the relation and its arguments. For example, node 602 of FIG. 6 indicates an employee/employer relation. The employee is reflected by node 604, but the employer is reflected by a nondirect descendant, node 606, so the training program adds pointer label 608 "org-ptr" to indicate that the organization is lower in the tree.

After generating the augmented trees, the training program generates the statistical model, a collection of probabilities reflecting both semantic and syntactic information (step 410). This model reflects the likelihood of various syntactic structures and meanings being matched with sequences of one or more words. This model is generated by using the same method described above relative to step 404.

Figure 8:
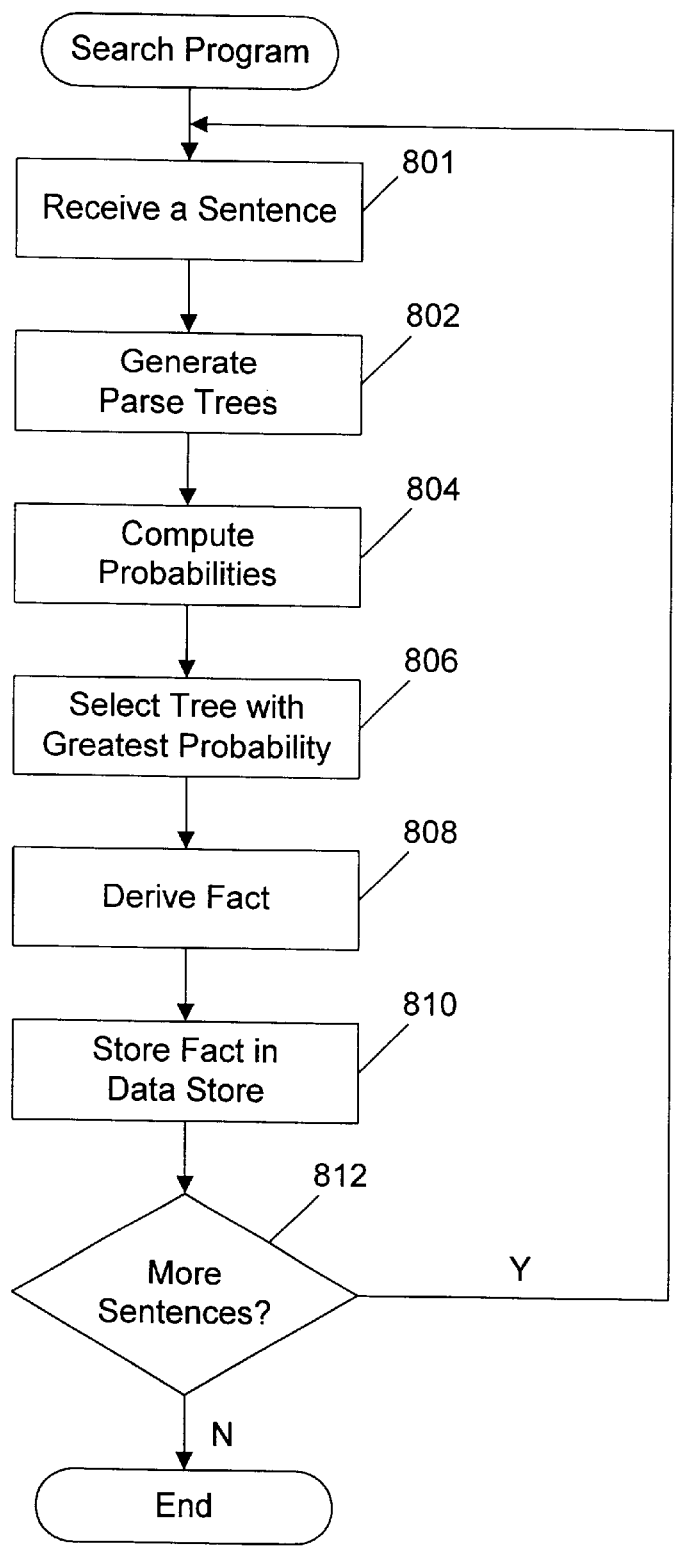
FIG. 8 depicts a flowchart of the steps performed by the search program depicted in FIG. 1.

FIG. 8 depicts a flowchart of the steps performed by the search program in accordance with methods and systems consistent with the present invention. The first step performed by the search program is to receive a sentence (step 801). Then, the search program generates parse trees for the sentence (step 802). These parse trees reflect possible syntactic structures for the sentence. The search program generates numerous parse trees for this sentence by using the well-known CKY algorithm, which is described in greater detail in Younger, "Recognition and Parsing of Context Free Languages in Time $N^3$," Information and Control, 10, 198–208 (1967). The CKY algorithm utilizes a number of grammar rules that are derived from the syntactic data. That is, the search program derives certain rules from the syntactic data that are applied during operation of the CKY algorithm to construct the trees. For example, where a particular head constituent and a particular modifier both have the same parent node, then when the CKY algorithm observes the same modifier with the same head constituent, the CKY algorithm groups them under the same parent node as previously observed. This rule applies if the modifier were a pre-modifier, appearing before the head constituent, or a post modifier, appearing after the head constituent. Furthermore, where a particular head constituent and two particular modifiers have the same parent node, when the CKY algorithm observes one of these modifiers and the same head constituent having the same parent node and also observes the other modifier which is not under the parent node, the CKY algorithm constructs a tree grouping the additional modifier under the parent node.

After generating the parse trees, the search program computes the probabilities for each node as described above relative to step 404 of FIG. 4 and for each of the parse trees by multiplying all the probabilities for all the nodes together (step 804). After computing the probabilities, the search program selects the tree with the greatest likelihood of matching the semantic meaning and syntactic structure of the sentence (step 806). After selecting this tree, the search program then derives one or more facts from the sentence (step 808) and stores it into the data store (step 810). The selected tree indicates both the meaning of the words and their relationship to other words. Thus, by examining the tree, the search program can derive facts from the sentence. Next, the search program determines if there are more sentences for processing (step 812). If so, processing continues to step 801. Otherwise, processing ends.

Although the present invention has been described with reference to a preferred embodiment thereof, those skilled in the art will know various changes in form and detail which may be made without departing from the spirit and scope of the present invention as defined in the appended claims and their full scope of equivalents.

What is claimed is:

1. A method in a data processing system, comprising the steps of:
   receiving a set of syntactic trees reflecting a syntactic structure of a first plurality of sentences;
   generating a syntactic model reflecting a likelihood of the syntactic structure;
   receiving semantically annotated sentences reflecting semantic information for a second plurality of sentences;
   identifying a most likely syntactic structure for each of the semantically annotated sentences by using the syntactic model;

augmenting the identified syntactic structures to include the semantic information for each of the second plurality of sentences;

generating a statistical model reflecting a likelihood of both the semantic information and the identified syntactic structure of the second plurality of sentences;

receiving a new sentence containing a fact; and recognizing the fact in the new sentence by using the statistical model.

2. The method of claim 1, wherein the recognizing step includes:

storing the fact in a data store.

3. The method of claim 1, wherein the recognizing step includes:

generating a plurality of parse trees for the new sentence, each parse tree reflecting likely semantic information and likely syntactic structure for at least a portion of the new sentence;

selecting from among the plurality of parse trees the parse tree having the greatest likelihood of matching the semantic information and the syntactic structure of the new sentence; and examining the selected parse tree to recognize the fact.

4. A method in a data processing system, comprising the steps of:

receiving syntactic language examples, wherein receiving syntactic language examples includes receiving first syntactic trees reflecting syntactic structure for a first plurality of sentences and generating a syntactic model containing probabilities indicating a likelihood of the syntactic structure for each of the first plurality of sentences;

receiving semantic language examples, wherein receiving semantic language examples includes receiving a second plurality of sentences with semantic annotations and generating second syntactic trees reflecting syntactic structure of the second plurality of sentences by using the syntactic model;

creating a model from both the syntactic language examples and the semantic language examples, wherein creating a model includes augmenting the second syntactic trees for the second plurality of sentences to include semantic information derived from the semantic annotations, wherein the augmented syntactic trees have nodes and augmenting the second syntactic trees includes generating probabilities for each of the nodes of the augmented syntactic trees;

using the model to determine a meaning of a sequence of words, wherein determining the meaning of a sequence of words includes recognizing at least one fact in the sequence of words; and storing the recognized fact in a data store.

5. A computer-readable medium containing instructions for controlling a data processing system to perform a method comprising the steps of:

receiving syntactic language examples, wherein receiving syntactic language examples includes receiving first syntactic trees reflecting syntactic structure for a first plurality of sentences and generating a syntactic model containing probabilities indicating a likelihood of the syntactic structure;

receiving semantic language examples, wherein receiving semantic language examples includes receiving a second plurality of sentences with semantic annotations and generating second syntactic trees reflecting syntactic structure of the second plurality of sentences by using the syntactic model;

creating a model from both the syntactic language examples and the semantic language examples, wherein creating a model includes augmenting the second syntactic trees for the second plurality of sentences to include semantic information derived from the semantic annotations, wherein the augmented syntactic trees have nodes and augmenting the second syntactic trees includes generating probabilities for each of the nodes of the augmented syntactic trees;

using the model to determine a meaning of a sequence of words, wherein determining the meaning of a sequence of words includes recognizing at least one fact in the sequence of words; and storing the recognized fact into a data store.

\* \* \* \* \*